(12) United States Patent
Edevold

(10) Patent No.: US 11,297,821 B2
(45) Date of Patent: Apr. 12, 2022

(54) VARMINT CONTROL DEVICE

(71) Applicant: Mark Edevold, Gonvick, MN (US)

(72) Inventor: Mark Edevold, Gonvick, MN (US)

( * ) Notice: Subject to any disclaimer, the term of this patent is extended or adjusted under 35 U.S.C. 154(b) by 562 days.

(21) Appl. No.: 16/216,606

(22) Filed: Dec. 11, 2018

(65) Prior Publication Data

US 2019/0183107 A1 Jun. 20, 2019

Related U.S. Application Data

(60) Provisional application No. 62/607,531, filed on Dec. 19, 2017.

(51) Int. Cl.
| | | |
|---|---|---|
| *A01M 23/08* | (2006.01) | |
| *A01M 23/12* | (2006.01) | |
| *A01M 23/00* | (2006.01) | |
| *A01M 23/30* | (2006.01) | |
| *A01M 23/20* | (2006.01) | |
| *A01M 31/00* | (2006.01) | |

(52) U.S. Cl.
CPC .......... *A01M 23/30* (2013.01); *A01M 23/005* (2013.01); *A01M 23/08* (2013.01); *A01M 23/12* (2013.01); *A01M 23/20* (2013.01); *A01M 31/002* (2013.01)

(58) Field of Classification Search
CPC ............................. A01M 23/005; A01M 23/08
USPC .......................................................... 43/136
See application file for complete search history.

(56) References Cited

U.S. PATENT DOCUMENTS

| | | | | |
|---|---|---|---|---|
| 2,054,730 | A * | 9/1936 | Pierpoint | A01M 1/10 43/121 |
| 3,025,630 | A * | 3/1962 | Silvey | A01M 25/004 43/131 |
| 3,864,866 | A * | 2/1975 | Kosinsky | A01M 23/005 43/58 |
| 4,244,134 | A * | 1/1981 | Otterson | A01M 23/005 43/114 |
| 4,363,184 | A * | 12/1982 | Marcolina | A01M 23/16 43/85 |
| 4,879,836 | A * | 11/1989 | Dolyny | A01M 23/08 43/64 |
| 5,175,958 | A * | 1/1993 | Wedemeyer | A01M 23/08 43/107 |
| 5,384,981 | A * | 1/1995 | Cohen | A01M 1/14 43/114 |
| 5,386,663 | A * | 2/1995 | Fields | A01M 23/08 43/66 |
| 5,477,636 | A * | 12/1995 | Musket | A01M 1/14 43/114 |

(Continued)

FOREIGN PATENT DOCUMENTS

| | | | | |
|---|---|---|---|---|
| CA | 2733269 | A1 * | 5/2012 | ............ A01M 23/08 |
| DE | 202016002613 | U1 * | 7/2016 | ............ A01M 23/18 |

(Continued)

*Primary Examiner* — Christopher P Ellis
(74) *Attorney, Agent, or Firm* — Schwegman Lundberg & Woessner P.A.

(57) ABSTRACT

A device for trapping a rodent includes one or more of a floor, walls connected to the floor, an aperture in at least one of the walls, and a platform positioned within the container. The platform is positioned adjacent to the aperture and elevated above the floor. An adhesive is positioned on the floor. The aperture is sized to permit a rodent to gain access to the platform.

5 Claims, 13 Drawing Sheets

(56) References Cited

U.S. PATENT DOCUMENTS

| | | | | |
|---|---|---|---|---|
| 5,572,825 | A * | 11/1996 | Gehret | A01M 1/02 229/120.11 |
| 5,577,342 | A * | 11/1996 | Johnson | A01M 23/005 43/114 |
| 5,673,509 | A * | 10/1997 | Gatewood, Jr. | A01M 23/005 383/106 |
| 7,856,752 | B1 * | 12/2010 | Eilersen | A01M 23/005 43/114 |
| 2002/0167409 | A1 * | 11/2002 | Cristofori | A01M 23/08 340/573.2 |
| 2005/0160660 | A1 * | 7/2005 | Frisch | A01M 1/14 43/114 |
| 2005/0279015 | A1 * | 12/2005 | Hall | A01M 23/08 43/66 |
| 2006/0254122 | A1 * | 11/2006 | Murchison | A01M 23/08 43/61 |
| 2007/0011942 | A1 * | 1/2007 | Hawkins | A01M 23/005 43/114 |
| 2008/0216385 | A1 * | 9/2008 | Peters | A01M 23/08 43/66 |
| 2008/0256842 | A1 * | 10/2008 | Vasseghi | A01M 23/08 43/65 |
| 2012/0180378 | A1 * | 7/2012 | Studer | A01M 23/08 43/60 |
| 2013/0118054 | A1 * | 5/2013 | Robinson | A01M 23/005 43/58 |
| 2013/0283671 | A1 * | 10/2013 | Czokajlo | A01M 1/145 43/113 |
| 2014/0352199 | A1 * | 12/2014 | Matney | A01M 23/04 43/61 |
| 2015/0033614 | A1 * | 2/2015 | Allbright, Jr. | A01M 23/08 43/60 |
| 2016/0165876 | A1 * | 6/2016 | Herbert | A01M 23/08 43/69 |
| 2016/0278363 | A1 * | 9/2016 | Hsu | A01M 23/005 |
| 2017/0118975 | A1 * | 5/2017 | Speckeen | A01M 25/002 |
| 2018/0325093 | A1 * | 11/2018 | Vickery | A01M 23/18 |

FOREIGN PATENT DOCUMENTS

| | | | | |
|---|---|---|---|---|
| EP | 2322035 | A1 * | 5/2011 | A01M 23/08 |
| FR | 1337380 | A * | 9/1963 | A01M 23/08 |
| FR | 2971672 | A1 * | 8/2012 | A01M 23/16 |
| FR | 3077956 | A1 * | 8/2019 | A01M 1/02 |
| WO | WO-2017015699 | A1 * | 2/2017 | A01M 23/08 |
| WO | WO-2020171544 | A2 * | 8/2020 | A01M 23/30 |

* cited by examiner

VARMINT CONTROL DEVICE

CROSS-REFERENCE TO RELATED APPLICATIONS

This application claims priority to U.S. Provisional Application Ser. No. 62/607,531, filed Dec. 19, 2017, which is incorporated herein by reference in its entirety.

TECHNICAL FIELD

The present disclosure generally relates to the field of controlling varmints, and in an embodiment, but not by way of limitation, a device for trapping mice, rats, insects, and other varmints.

BACKGROUND

A purpose of the United States Patent Law and System is to encourage and reward inventors for advancing technology and improving the lives of others by conceiving and disclosing to the public new and useful products. The desire of inventors to improve the lives of others through their innovations has in the past been generally described as the quest to build a better mousetrap. The current disclosure, in an embodiment, literally relates to the building of that better mousetrap.

DESCRIPTION OF THE DRAWINGS

Some embodiments are illustrated by way of example and not limitation in the accompanying drawings, in which.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

Figure 1:
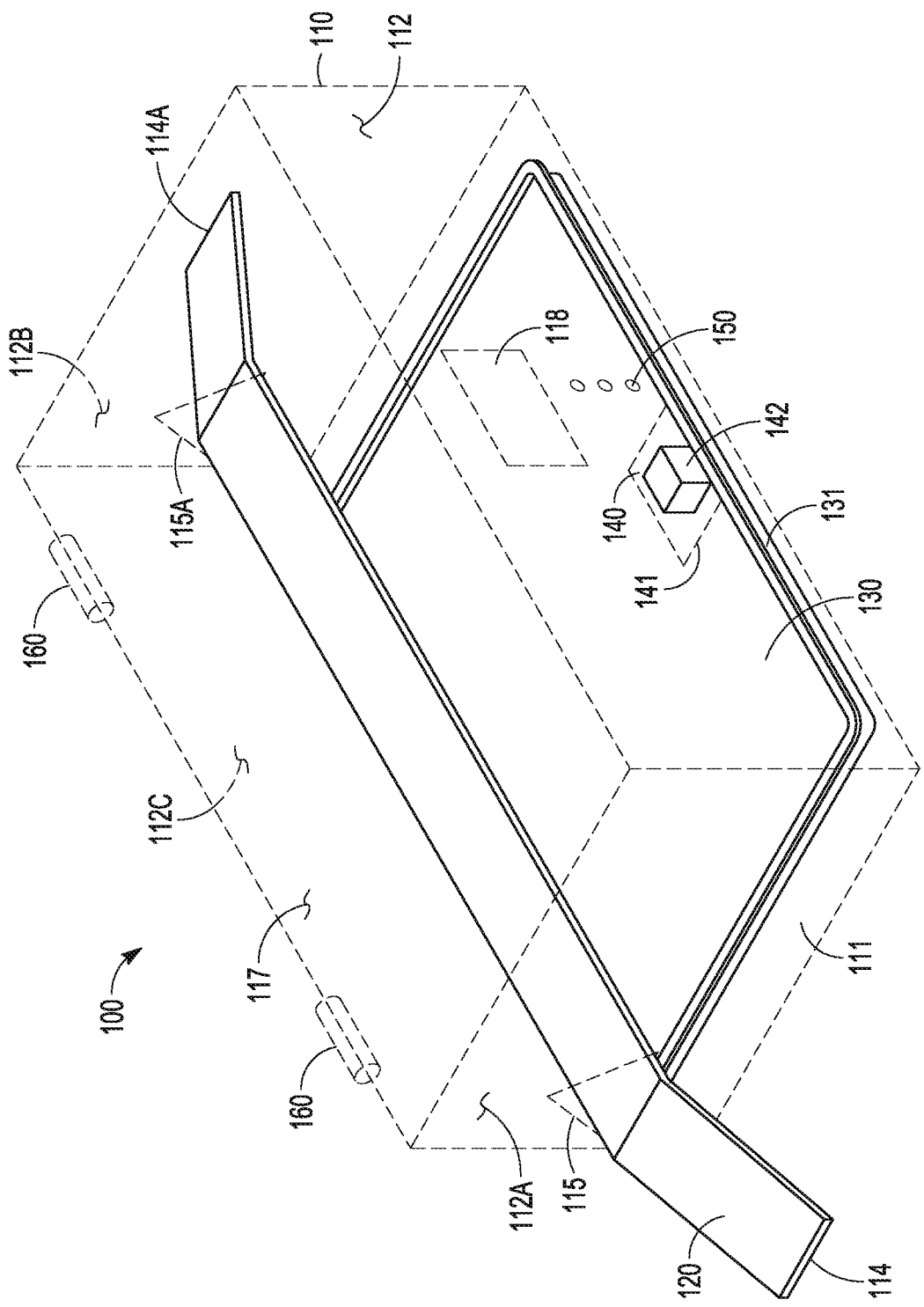
FIG. 1 is an illustration of an embodiment of a varmint control device.

FIG. 1 illustrates an embodiment of a device 100 for trapping a varmint. As with other embodiments disclosed herein, such a varmint can be a mouse, a rat, a chipmunk, insects, and other varmints. The device 100 of FIG. 1 includes a housing 110, The housing 110 can be made of any suitable material including plastic (both clear and opaque), metal, aluminum, cardboard, etc. If opaque, the housing can include a window 118 so that the contents of the device can be seen. The housing 110 in FIG. 1 is drawn in a dotted line format to indicate that while the housing 110 can be opaque, it is illustrated in FIG. 1 in a transparent manner such that the contents of the housing 110 can be seen. The housing includes four walls 112, 112A, 112B, and 112C, which are attached to a base level 111. An embodiment includes a ceiling 117 that is attached to the walls 112, 112A, 112B, and 112C. Depending on the embodiment, the ceiling can be about 6 inches above the base level 111. The ceiling 117 can be a simple covering, similar to the top of an ordinary shoe box, that can be removed to permit the removal and/or replacement of the contents of the device. The ceiling 117 can also be attached to one of the walls 112, 112A, 112B, or 112C in a hinged manner (160) to permit the raising of the ceiling 117 to expose the contents inside the device 100. In another embodiment, there is no ceiling and the top of the housing is simply open leaving the inside and contents of the device 100 accessible. Alternatively, one of the walls 112, 112A, 112B, or 112C can be removably attachable, by hinges or other means, to permit access to the contents inside of the device 100. The walls can be vertical, substantially vertical, or angled. Similarly, the ceiling can be horizontal, substantially horizontal, or angled.

The housing 110 includes an opening or aperture 115. In an embodiment, the housing 110 can include a second opening 115A. The openings 115, 115A are sized depending upon the type of varmint desired to be trapped. For example, the openings 115, 115A can be sized to permit a mouse to enter the housing 110, but would be sized larger if it was desired to trap rats instead of or in addition to mice. As illustrated in FIG. 1, the opening 115 is elevated from the base level 111 of the housing 110. Depending on the embodiment, the opening 115 can be positioned from one to three inches or more above the base level 111. As further can be seen in FIG. 1, the opening 115 is positioned distant from the wall 112 of the housing. Depending on the embodiment, the distance from the opening 115 to the wall 112 can be from three to six inches or more. A ramp 120 is positioned adjacent to the opening 115 in the housing, the ramp extending from a point 114 that is even with the base level 111 of the housing and distant from the wall 112A, through to the opening 115A in the wall 112B of the housing, and through the opening 115A to a point 114A that is distant from the wall 112B and even with the base level 111. Depending on the embodiment, these distances from points 114, 114A to the base level 111 can be from three to six inches or more. An adhesive 130 is positioned on the base level 111 of the housing 110. The adhesive can be directly applied to the base level 111, or can be contained within a tray or other container 131. The tray 131 can be a typical glue trap that is used to trap mice, rats, and other varmints, and which can be purchased at any hardware or home supply store. In embodiments that include a ceiling on the housing, the ceiling prevents dirt and dust from settling on the adhesive, which decreases the stickiness of the adhesive and denigrates the trapping effectiveness of the adhesive. In an embodiment, the device 100 does not include the ramp 120.

The device 100 can further include an area 140 for containing bait to attract a varmint. A typical bait used to attract a varmint is peanut butter. The area can be delineated by a marking 141 on the wall 112 (or on the adhesive 130 or the container 131). In an embodiment, the area 140 includes a small container 142 which serves to help contain the bait in the area. In an embodiment, the housing 110 can include a plurality of apertures 150 so that the scent of the bait can exude out of the device 100 and attract a varmint to the device and into the device.

In the embodiment of FIG. 1, as with other embodiments disclosed herein, the device is placed in an area wherein rodents or other varmints are known to frequent. When encountering the device 100, the rodent climbs up the ramp 120 and enters the housing 110 of the device 100. Upon entering the housing, the rodent further senses the bait in the area 140 that is distant from the ramp. Because the bait is distant from the ramp and at a lower level than the ramp, the rodent must jump down, drop down, or otherwise lower itself down to the level of the bait. This lowering of itself by the rodent causes a force to be applied by the rodent onto the adhesive 130, such that the rodent is forcibly trapped in the adhesive 130. This force causes a more secure trapping of the rodent as compared to prior uses of such glue traps wherein a rodent could with little force merely step on or otherwise touch the glue trap and not even become stuck therein (or simply walk around the glue trap to avoid capture). This force exerted on the adhesive by the rodent is particular useful in a colder environment when the adhesive is not as soft and sticky.

Figure 2A:
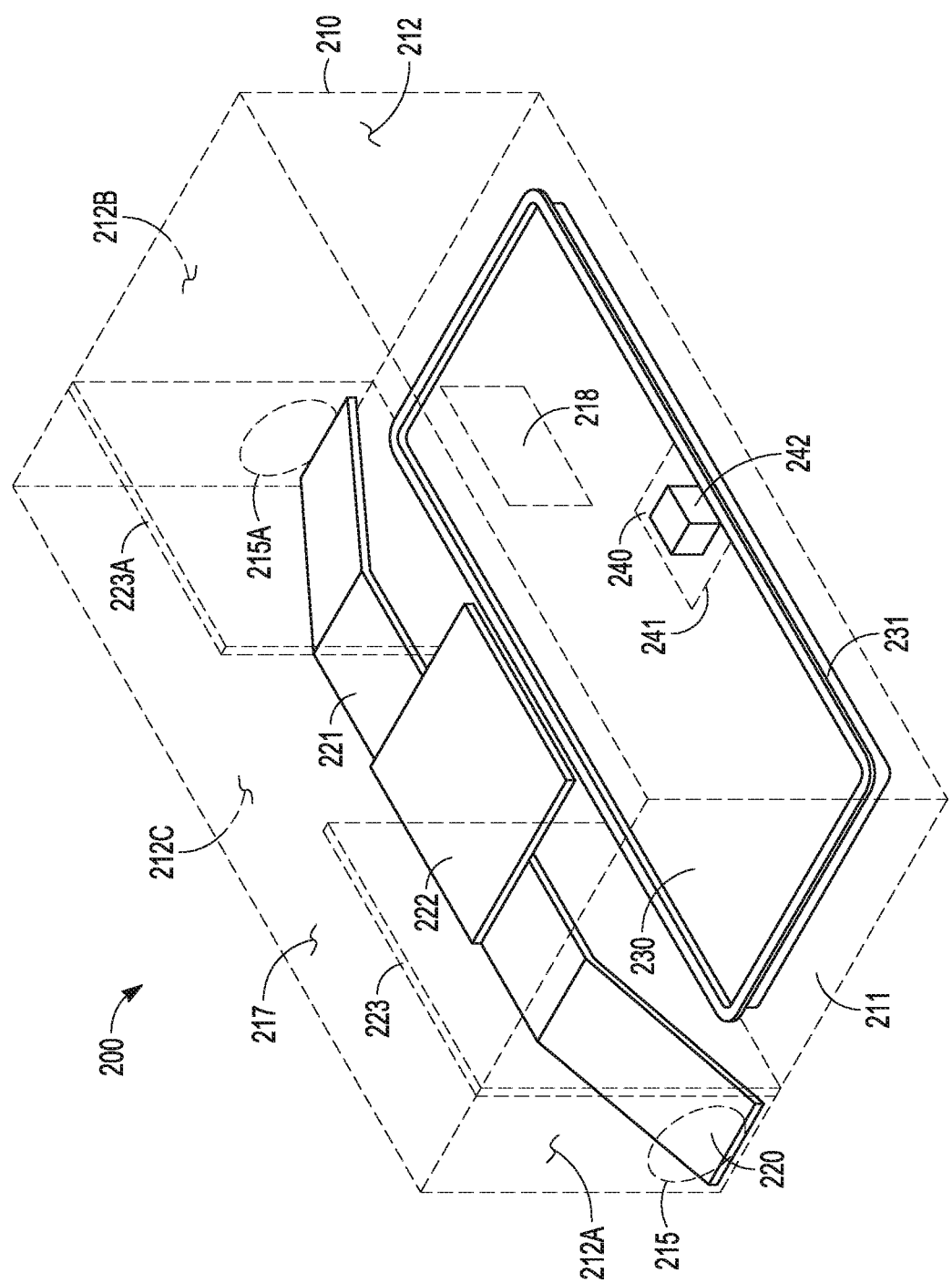
FIG. 2A is an illustration of an embodiment of a varmint control device.

FIG. 2A illustrates another embodiment of a device 200 to trap or capture a rodent or other varmint. The device 200 of FIG. 2A includes a housing 210. The housing 210 can be made of any suitable material including plastic (both clear and opaque), metal, aluminum, cardboard, etc. If opaque, the housing can include a window 218 so that the contents of the device can be seen. The housing 210 in FIG. 2A is drawn in a dotted line format to indicate that while the housing 210 can be opaque, it is illustrated in FIG. 2A in a transparent manner such that the contents of the housing 210 can be seen. The housing includes four walls 212, 212A, 212B, and 212C, which are attached to a base level 211. An embodiment includes a ceiling 217 that is attached to the walls 212, 212A, 212B, and 212C. Depending on the embodiment, the ceiling can be about six inches above the base level 211. The ceiling 217 can be a simple covering, similar to a top of an ordinary shoe box, that can be removed to permit the removal and/or replacement of the contents of the device. The ceiling 217 can also be attached to one of the walls 212, 212A, 212B, or 212C in a hinged manner to permit the raising of the ceiling 217 to expose the contents inside the device 200. In another embodiment, there is no ceiling and the top of the housing is simply open leaving the inside and contents of the device 200 accessible. Alternatively, one of the walls 212, 212A, 212B, or 212C can be removably attachable, by hinges or other means, to permit access to the contents inside of the device 200.

The housing 210 includes an opening or aperture 215. In an embodiment, the housing 210 can include a second opening 215A. The openings 215, 215A are sized depending upon the type of varmint desired to be trapped. For example, the openings 215, 215A can be sized to permit a mouse to enter the housing 210, but would be sized larger if it was desired to trap rats instead of or in addition to mice. As illustrated in FIG. 2A, the opening 215 is positioned at the base level 211 of the housing 210. As further can be seen in FIG. 2A, the opening 215 is positioned distant from the wall 212 of the housing. Depending on the embodiment, the distance from the opening 215 to the wall 212 can be from three to six inches or more. A ramp 220 is positioned adjacent to the opening 215 in the housing. From the opening 215, the ramp 220 slopes up to a horizontal level 221 upon which a platform 222 can be attached, and then slopes down to the second opening 215A. An adhesive 230 is positioned on the base level 211 of the housing 220. The adhesive can be directly applied to the base level 211, or can be contained within a tray or other container 231. The tray 231 can be a typical glue trap that is used to trap mice, rats, and other varmints, and which can be purchased at any hardware or home supply store. In an embodiment, substantially vertical walls 223, 223A can be placed adjacent the sloping portions of the ramp. Walls 223, 223A prevent the rodent from simply stepping onto the adhesive 230, and indeed force the rodent to the elevated platform in 222 so that the rodent is forced to fall onto, jump onto, or otherwise impact the adhesive 230 with some force.

The device 200 can further include an area 240 for containing bait to attract a varmint. A typical bait used to attract a varmint is peanut butter. The area 240 can be delineated by a marking 241 on the wall 212 (or on the adhesive 230 or the container 231). In an embodiment, the area 240 includes a small container 242 which serves to help contain the bait in the area 240.

Figure 2B:
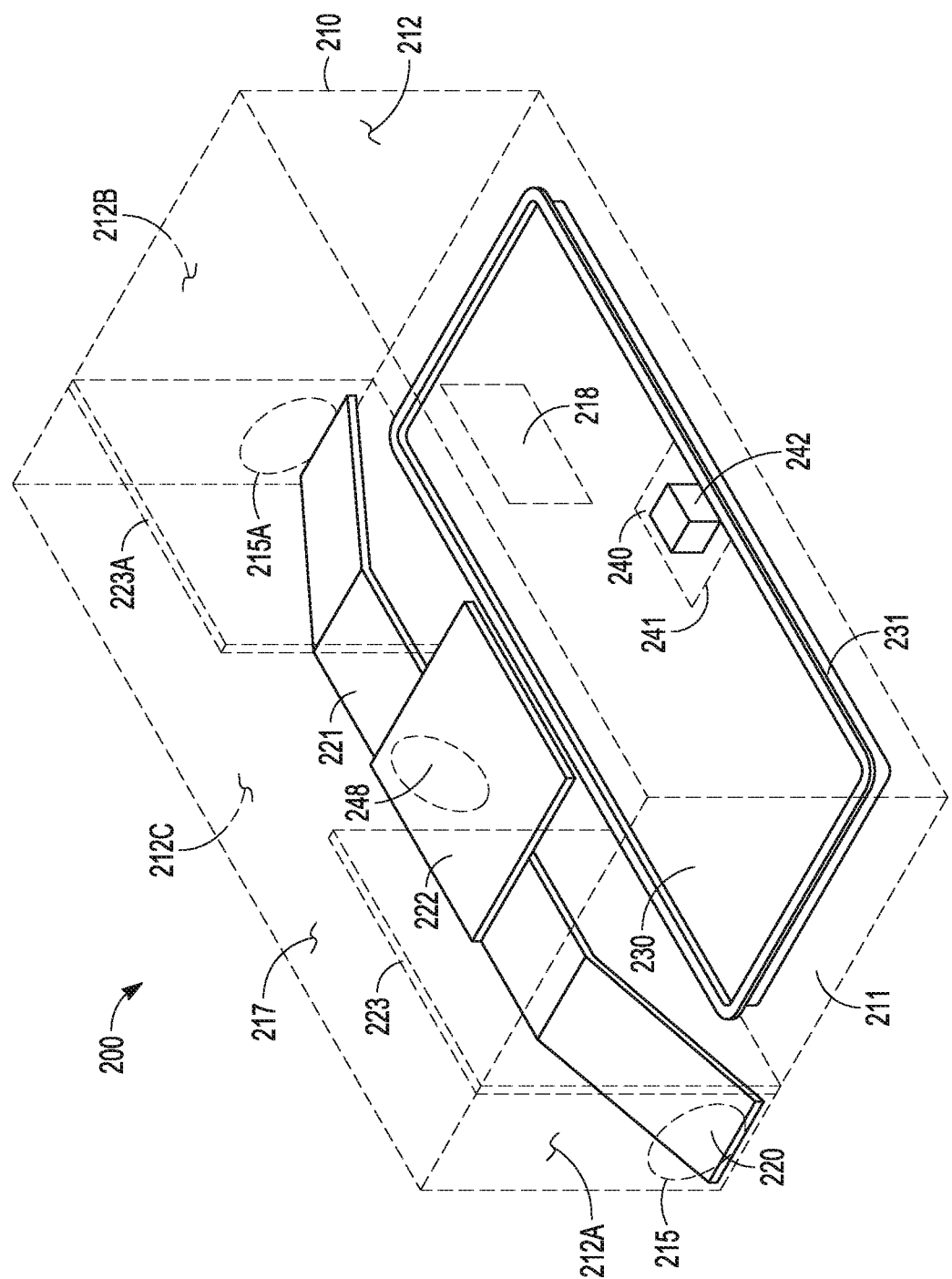
FIG. 2B is an illustration of an embodiment of a varmint control device.

FIG. 2B illustrates another embodiment of a varmint control device. The embodiment of FIG. 2B is substantially similar to the embodiment of FIG. 2A. One difference between the embodiments of FIGS. 2A and 2B is that the embodiment of FIG. 2B includes an opening 248 that is located in the wall 212C. The opening 248 provides access to a compartment that is formed by the wall 212C, the ramp 220, 221, the platform 222, and the interior walls 223 and 223A. This compartment can be used for the placement of a rodenticide, such that a varmint can enter the compartment via the opening 248, ingest the rodenticide, and thereafter perish from the ingestion.

Figure 3:
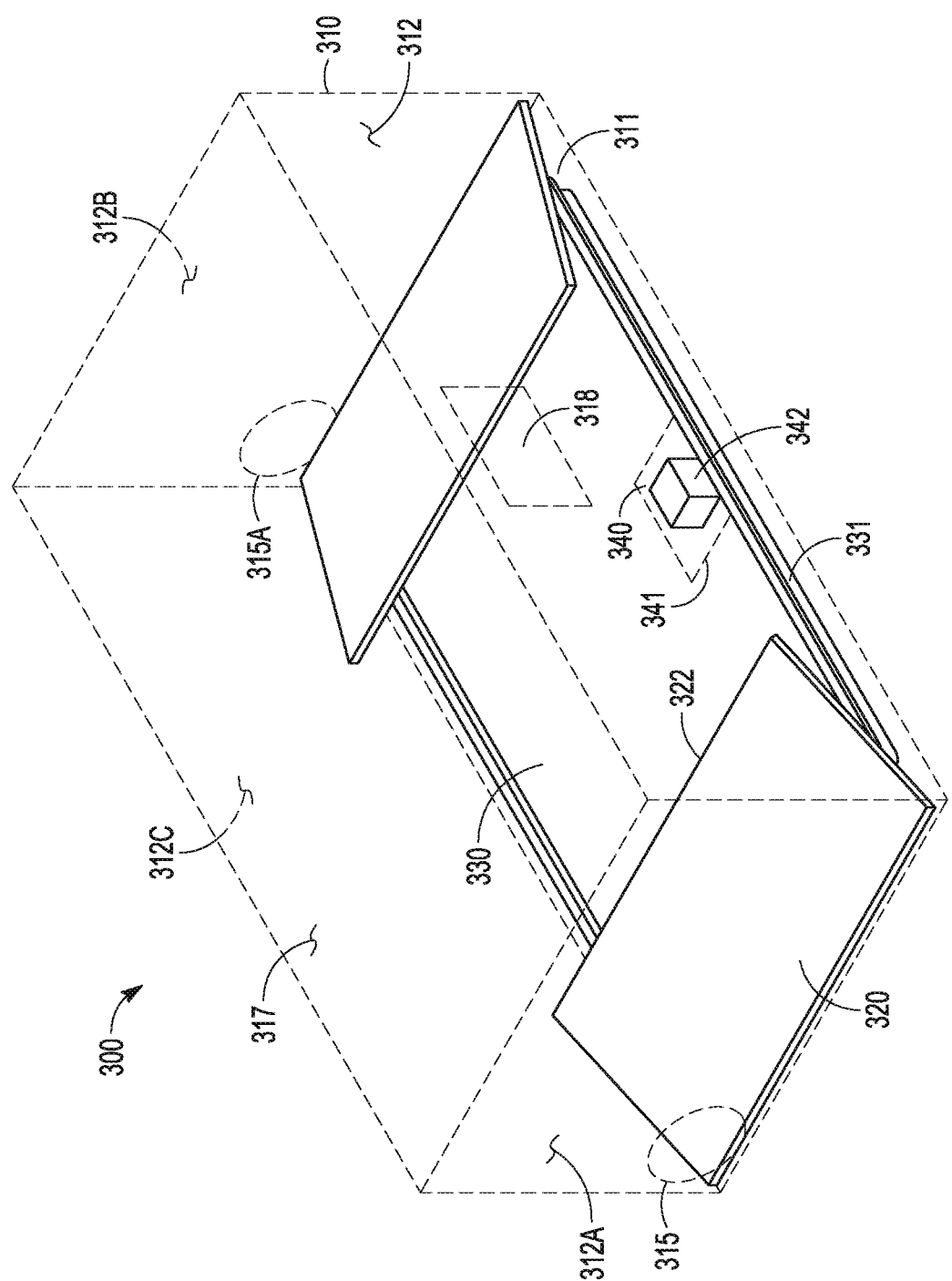
FIG. 3 is an illustration of an embodiment of a varmint control device.

FIG. 3 illustrates another embodiment of a device 300 for trapping a varmint. The device 300 of FIG. 3 includes a housing 310. The housing 310 can be made of any suitable material including plastic (both clear and opaque), metal, aluminum, cardboard, etc. If opaque, the housing can include a window 318 so that the contents of the device can be seen. The housing 310 in FIG. 3 is drawn in a dotted line format to indicate that while the housing 310 can be opaque, it is illustrated in FIG. 3 in a transparent manner such that the contents of the housing 310 can be seen. The housing includes four walls 312, 312A, 312B, and 312C, which are attached to a base level 311. An embodiment includes a ceiling 317 that is attached to the walls 312, 312A, 312B, and 312C. Depending on the embodiment, the ceiling 317 can be about six inches above the base level 311. The ceiling 317 can be a simple covering, similar to a top of an ordinary shoe box, that can be removed to permit the removal and/or replacement of the contents of the device. The ceiling 317 can also be attached to one of the walls 312, 312A, 312B, or 312C in a hinged manner to permit the raising of the ceiling 317 to expose the contents inside the device 300. In another embodiment, there is no ceiling and the top of the housing is simply open leaving the inside and contents of the device 300 accessible. Alternatively, one of the walls 312, 312A, 312B, or 312C can be removably attachable, by hinges or other means, to permit access to the contents inside of the device 300.

The housing 310 includes an opening or aperture 315. In an embodiment, the housing 310 can include a second opening 315A. The openings 315, 315A are sized depending upon the type of varmint desired to be trapped. For example, the openings 315, 315A can be sized to permit a mouse to enter the housing 310, but would be sized larger if it was desired to trap rats instead of or in addition to mice. As illustrated in FIG. 3, the opening 315 is positioned at the base level 311 of the housing 310. A ramp 320 is positioned adjacent to the opening 315 in the housing. The ramp 320 slopes up from the base level 311 of the housing such that an end 322 of the ramp 320 opposite the opening 315 is elevated from the base level 311 of the housing. An adhesive 330 is positioned on the base level 311 of the housing 310. The adhesive can be directly applied to the base level 311, or can be contained within a tray or other container 331. The tray 331 can be a typical glue trap that is used to trap mice, rats, and other varmints, and which can be purchased at any hardware or home supply store.

The device 300 can further include an area 340 for containing bait to attract a varmint. A typical bait used to attract a varmint is peanut butter. The area can be delineated by a marking 341 on the wall 312 (or on the adhesive 330 or the container 331). In an embodiment, the area 340 includes a small container 342 which serves to help contain the bait in the area 340. As with other embodiments, the elevation of the ramp end 322 above the adhesive 330, and the distance of the bait in area 340 from the end of the ramp 322, causes the rodent to have to jump onto, fall onto, or otherwise forcibly contact the adhesive 330 such that the rodent is more securely trapped in the adhesive as compared to merely stepping on the adhesive.

Figure 4:
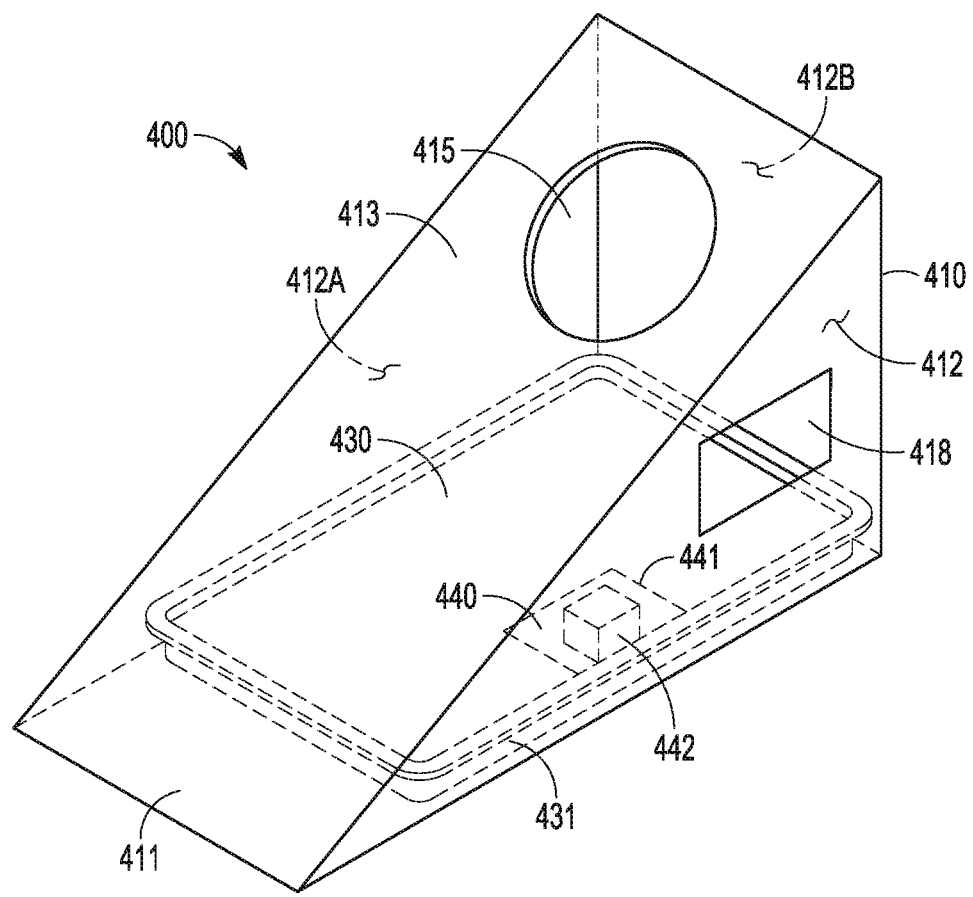
FIG. 4 is an illustration of an embodiment of a varmint control device.

FIG. 4 illustrates another embodiment of a device 400 for trapping a varmint. The device 400 of FIG. 4 includes a housing 410. The housing 410 can be made of any suitable material including plastic (both clear and opaque), metal, aluminum, cardboard, etc. If opaque, the housing can include a window 418 so that the contents of the device can be seen. The housing 410 includes a base 411, a first substantially vertical wall 412 coupled to the base 411, a second substantially vertical wall 412A coupled to the base 411, a third substantially vertical wall 412B coupled to the base 411, and an angled wall 413 coupled to the base 411, the first substantially vertical wall 412, the second substantially vertical wall 412A, and the third substantially vertical wall 4129. An opening 415 is positioned in the angled wall such that the opening is elevated above the base 411. In another embodiment, the opening 415 is positioned in wall 412, wall 412A, or wall 4129. Depending on the embodiment, the opening can be about three to six inches or more above the base level 411. The opening 415 is sized depending upon the type of varmint desired to be trapped. For example, the opening 415 can be sized to permit a mouse to enter the housing 410, but would be sized larger if it was desired to trap rats instead of or in addition to mice.

An adhesive 430 is positioned on the base level 411 of the housing 410. The adhesive can be directly applied to the base level 411, or can be contained within a tray or other container 431. The tray 431 can be a typical glue trap that is used to trap mice, rats, and other varmints, and which can be purchased at any hardware or home supply store.

The device 400 can further include an area 440 for containing bait to attract a varmint. A typical bait used to attract a varmint is peanut butter. The area can be delineated by a marking 441 on the adhesive 430 or the tray or container 431. In an embodiment, the area 440 includes a small container 442 which serves to help contain the bait in the area. In the embodiment of FIG. 4, the rodent or other varmint peers into the device 400 via the opening 415. The rodent is then attracted to the bait in area 440, and because of the height of the opening 415 above the bait and adhesive 430, has to jump or fall down to the bait, and then becomes forcibly stuck in the adhesive 430.

Figure 5:
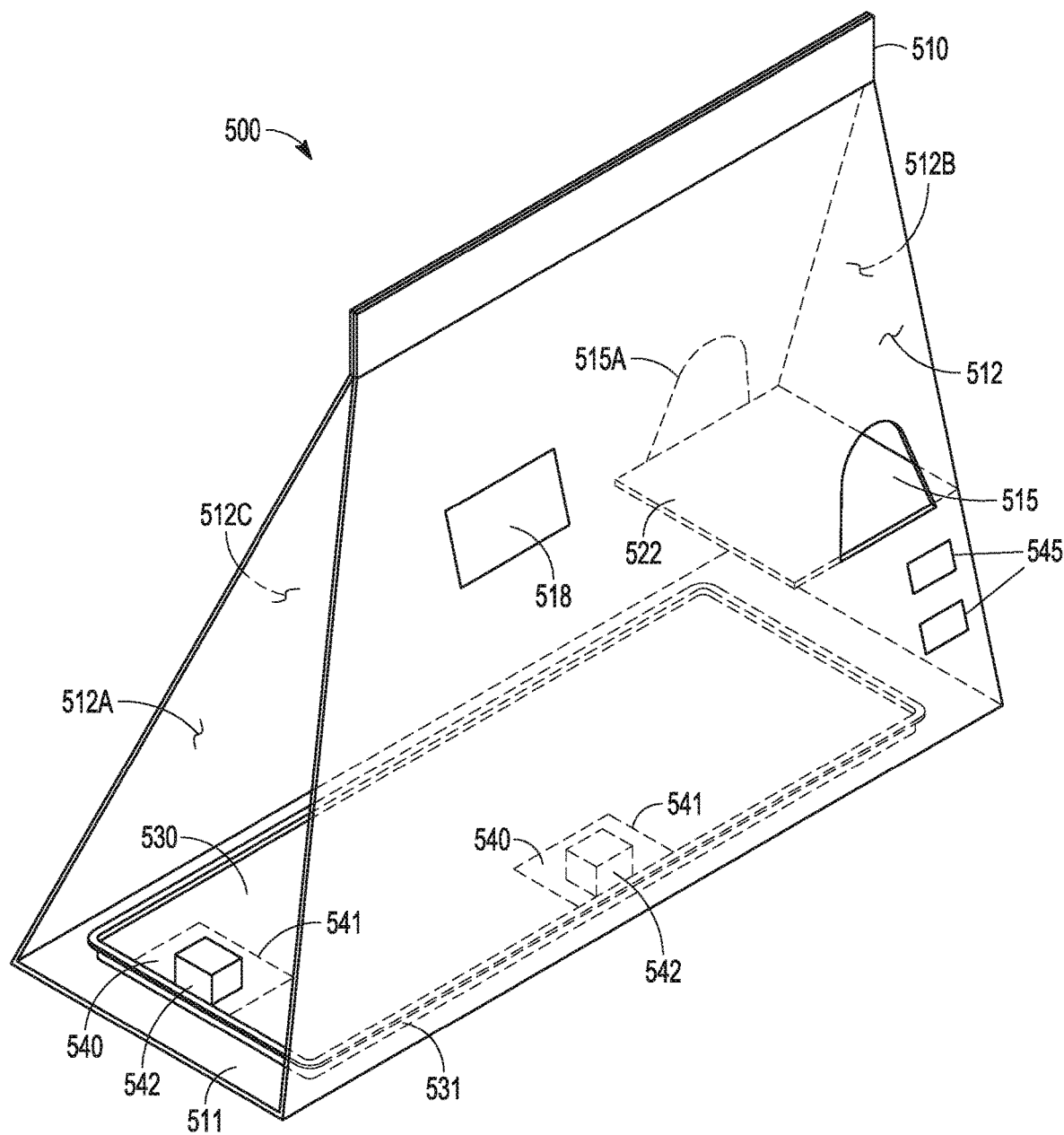
FIG. 5 is an illustration of an embodiment of a varmint control device.

FIG. 5 illustrates another embodiment of a device 500 for trapping a varmint. The device 500 of FIG. 5 includes a housing 510. The housing 510 can be made of any suitable material including plastic (both clear and opaque), metal, aluminum, cardboard, etc. If opaque, the housing can include a window 518 so that the contents of the device can be seen. The housing includes four walls 512, 512A, 512B, and 512C, which are attached to a base level 511. In an embodiment, the wall 512A can be made of a transparent material so that the contents of the housing 510 can easily be seen.

The housing 510 includes an opening or aperture 515. In an embodiment, the housing 510 can include a second opening 515A. The openings 515, 515A are sized depending upon the type of varmint desired to be trapped. For example, the openings 515, 515A can be sized to permit a mouse to enter the housing 510, but would be sized larger if it was desired to trap rats instead of or in addition to mice. As illustrated in FIG. 5, the opening 515 is elevated from the base level 511 of the housing 510. Depending on the embodiment, the opening 515 can be positioned from three to six or more inches above the base level 511. Indentations or protrusions 545 can be placed on the wall 512 of the housing such that a varmint can more easily scale the wall 512 to gain access to the opening 515. As further can be seen in FIG. 5, the opening 515 is positioned distant from the wall 512A of the housing. Depending on the embodiment, the distance from the opening 515 to the wall 512A can be from three to six or more inches. A platform 522 is positioned adjacent to the openings 515, 515A in the housing. In another embodiment, the platform 522 is not present. An adhesive 530 is positioned on the base level 511 of the housing 510. The adhesive can be directly applied to the base level 511, or can be contained within a tray or other container 531. The tray 531 can be a typical glue trap that is used to trap mice, rats, and other varmints, and which can be purchased at any hardware or home supply store.

The device 500 can further include an area 540 for containing bait to attract a varmint. A typical bait used to attract a varmint is peanut butter. The area can be delineated by a marking 541 on the wall 512A (or on the adhesive 530 or the container 531). In an embodiment, the area 540 includes a small container 542 which serves to help contain the bait in the area. As illustrated in FIG. 5, the area 540 can be located beneath the platform 522 such that the varmint has to let itself down with force onto the adhesive 530, or it can be located distant from the platform 522 so that the varmint has to leap towards the bait in the area 540, such that the varmint impacts the adhesive 530 with even more force.

Figure 6:
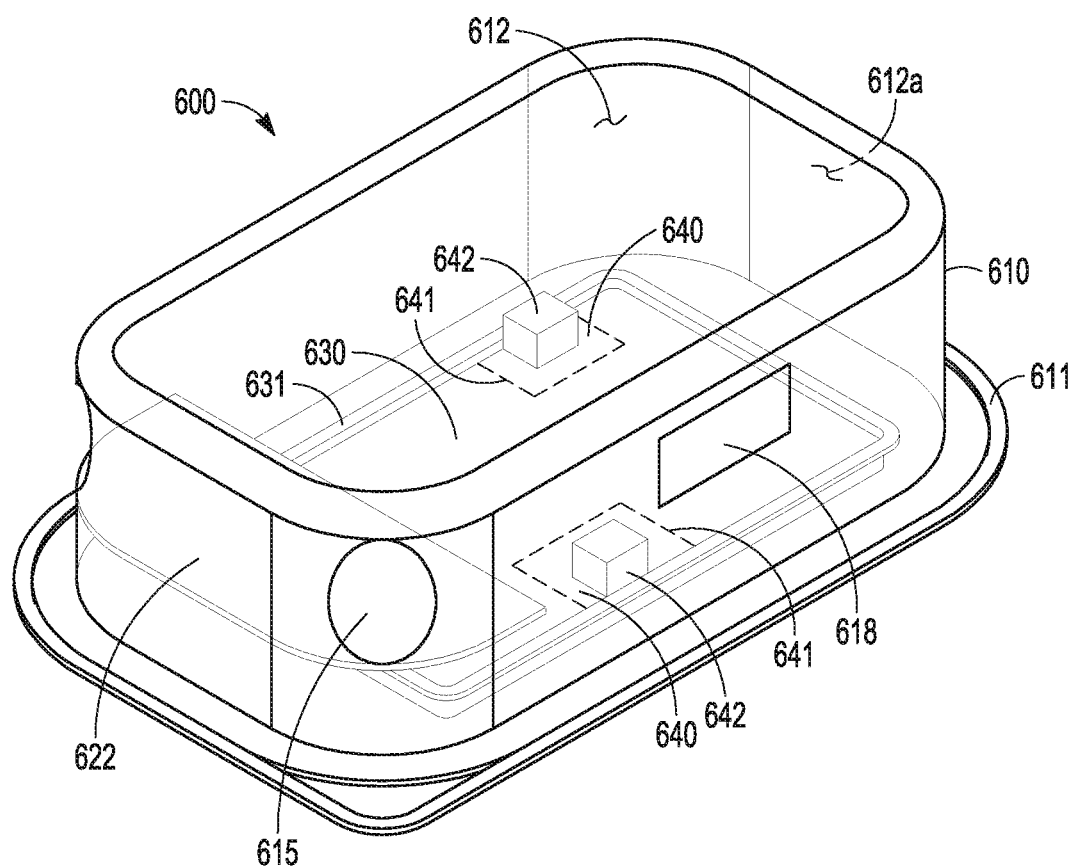
FIG. 6 is an illustration of an embodiment of a varmint control device.

FIG. 6 illustrates another embodiment of a device 600 for trapping a varmint. The device 600 of FIG. 6 includes a housing 610. The housing 610 can be made of any suitable material including plastic (both clear and opaque), metal, aluminum, cardboard, etc. If opaque, the housing can include a window 618 so that the contents of the device can be seen. In the embodiment of FIG. 6, the housing includes a unitary cover 612, which is attached to a base level 611. Depending on the embodiment, the top of the cover 612 can be about three to six or more inches above the base level 611. The cover 612 can be attached to the base level 611 in a detachable or permanent manner.

The housing 610 includes an opening or aperture 615. The opening 615 is sized depending upon the type of varmint desired to be trapped. For example, the opening 615 can be sized to permit a mouse to enter the housing 610, but would be sized larger if it was desired to trap rats instead of or in addition to mice. As illustrated in FIG. 6, the opening 615 is elevated from the base level 611 of the housing 610. Depending on the embodiment, the opening 615 can be positioned from one to three or more inches above the base level 611. As further can be seen in FIG. 6, the opening 615 is positioned distant from a wall 612A of the covering 612. Depending on the embodiment, the distance from the opening 615 to the wall 612A can be from three to six or more inches. A platform 622 is positioned adjacent to the opening 615 in the housing. In another embodiment, the platform 622 is not present. An adhesive 630 is positioned on the base level 611 of the housing 610. The adhesive 630 can be directly applied to the base level 611, or can be contained within a tray or other container 631. The tray 631 can be a typical glue trap that is used to trap mice, rats, and other varmints, and which can be purchased at any hardware or home supply store.

The device 600 can further include an area 640 for containing bait to attract a varmint. A typical bait used to attract a varmint is peanut butter. The area can be delineated by a marking 641 on the adhesive 630 or the container 631. In an embodiment, the area 640 includes a small container 642 which serves to help contain the bait in the area. As illustrated in FIG. 6, the area 640 can be located beneath the platform 622 such that the varmint has to let itself down with force onto the adhesive 630, or it can be located distant from the platform 622 so that the varmint has to leap towards the bait in the area 640, such that the varmint impacts the adhesive 630 with even more force.

Figure 7A:
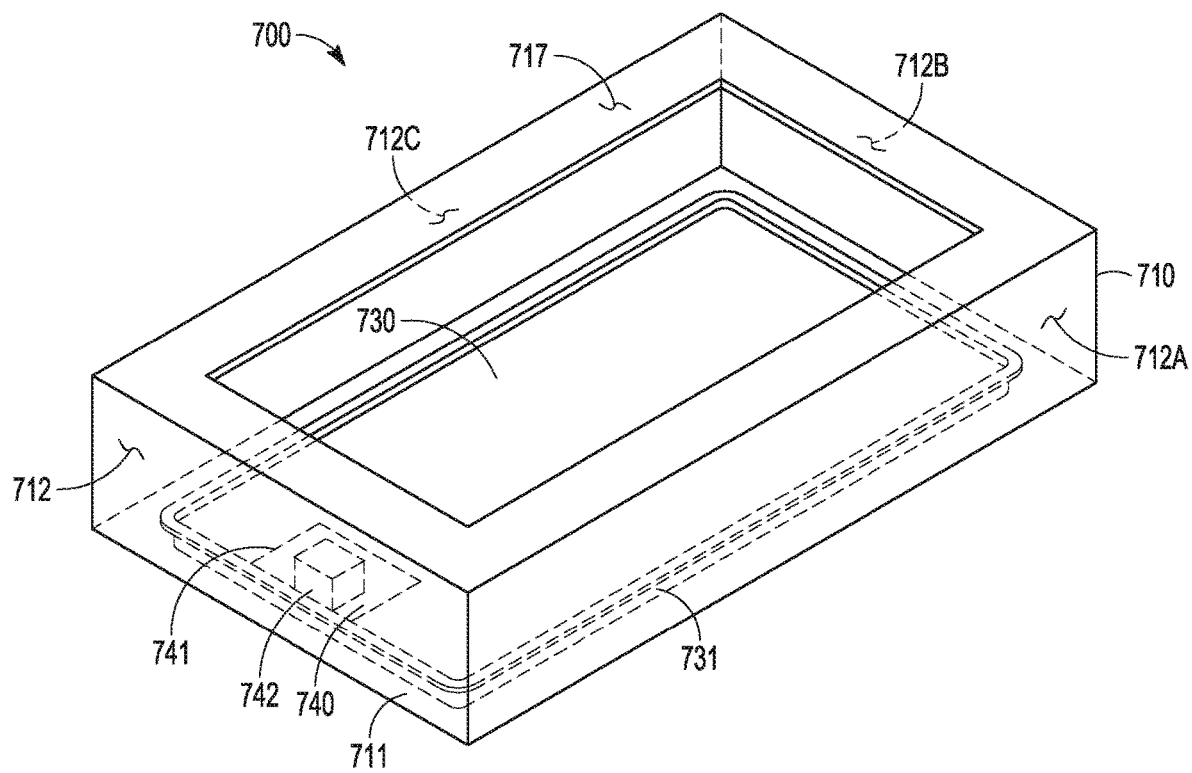
FIG. 7A is an illustration of an embodiment of a varmint control device.

FIG. 7A illustrates another embodiment of a device 700 for trapping a varmint. The device 700 of FIG. 7A includes a housing 710. The housing 710 can be made of any suitable material including plastic (both clear and opaque), metal, aluminum, cardboard, etc. The housing includes four walls 712, 712A, 712B, and 712C, which are attached to a base level 711. An embodiment includes a ridge (or ledge) 717 that is attached to the walls 712, 712A, 712B, and 712C. Depending on the embodiment, the ridge can be about six inches above the base level 711. The ridge 717 prevents a rodent from scurrying down one of the walls 712, 712A, 712B, or 712C and gently contacting an adhesive 730. Rather, with the ridge 717 in place, the rodent is more likely to drop onto the adhesive and become forcibly embedded in the adhesive.

As noted, an adhesive 730 is positioned on the base level 711 of the housing 710. The adhesive can be directly applied to the base level 711, or can be contained within a tray or other container 731. The tray 731 can be a typical glue trap that is used to trap mice, rats, and other varmints, and which can be purchased at any hardware or home supply store.

The device 700 can further include an area 740 for containing bait to attract a varmint. A typical bait used to attract a varmint is peanut butter. The area can be delineated by a marking 741 on the wall 712 (or on the adhesive 730 or the glue/adhesive container 731). In an embodiment, the area 740 includes a small container 742 which serves to help contain the bait in the area.

Figure 7B:
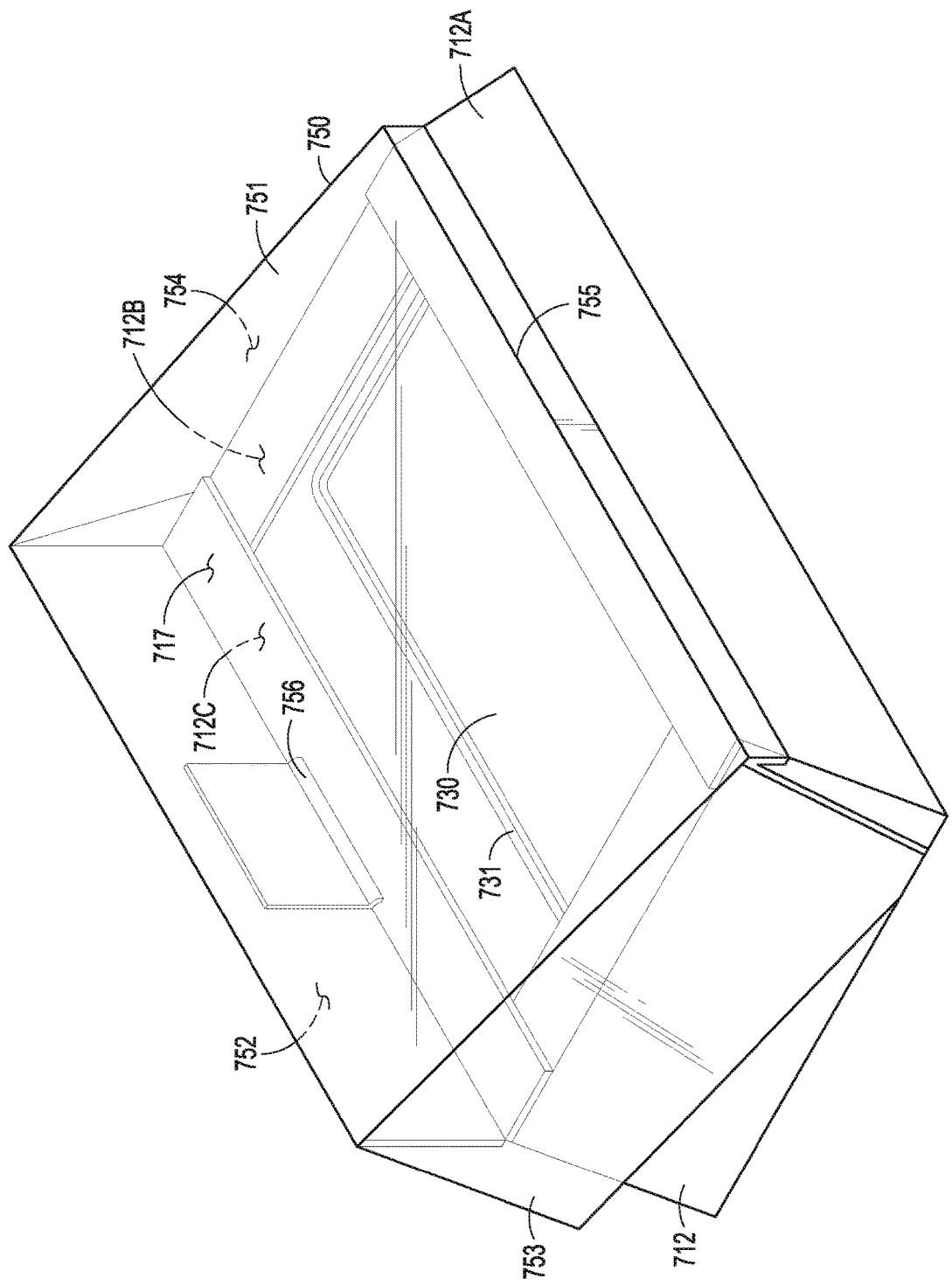
FIG. 7B is an illustration of an embodiment of a varmint control device.

FIG. 7B illustrates another embodiment of a varmint control device. The embodiment of FIG. 7B is substantially similar to the embodiment of FIG. 7A. One difference between the embodiments of FIGS. 7A and 7B is that the embodiment of FIG. 7B includes a covering 750. The covering prevents dirt and other grime from fouling the adhesive surface 730. The covering 750 includes a first panel 751, a second panel 752 that is substantially perpendicular to the first panel 751, and a third panel 753 and a fourth panel 754 that are non-perpendicular to the first panel 751. As further illustrated in FIG. 7B, a first edge 755 of the first panel 751 is coupled to the ridge 717. The second panel 752 further includes a protrusion 756 or other device to contact the ridge 717. The contacting of protrusion 756 with the ridge 717 causes the first panel 751 to not be parallel with the base level 711 or adhesive surface 730. The contacting of the protrusion 756 with the ridge 717 further causes a space between the walls 712 and 712B. This space permits a varmint to access the control device and become trapped in the adhesive surface 730 by jumping onto, dropping onto, or falling onto the adhesive surface.

Figure 8A:
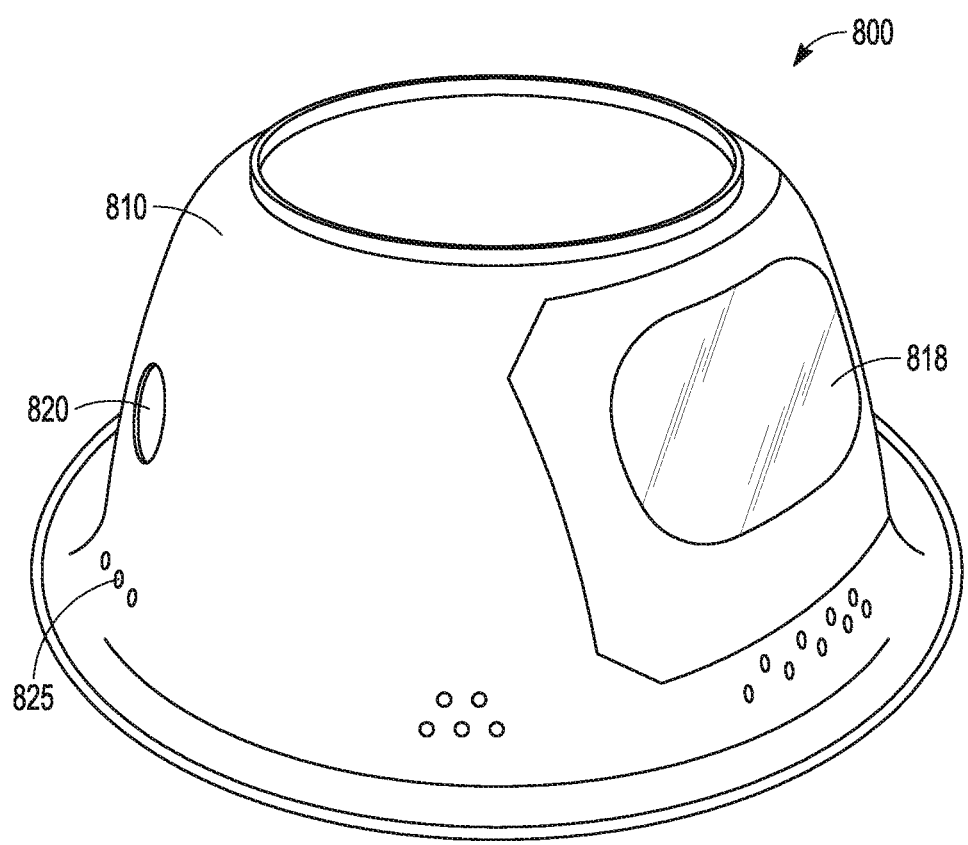
FIG. 8A is an illustration of an embodiment of a varmint control device.
Figure 8B:
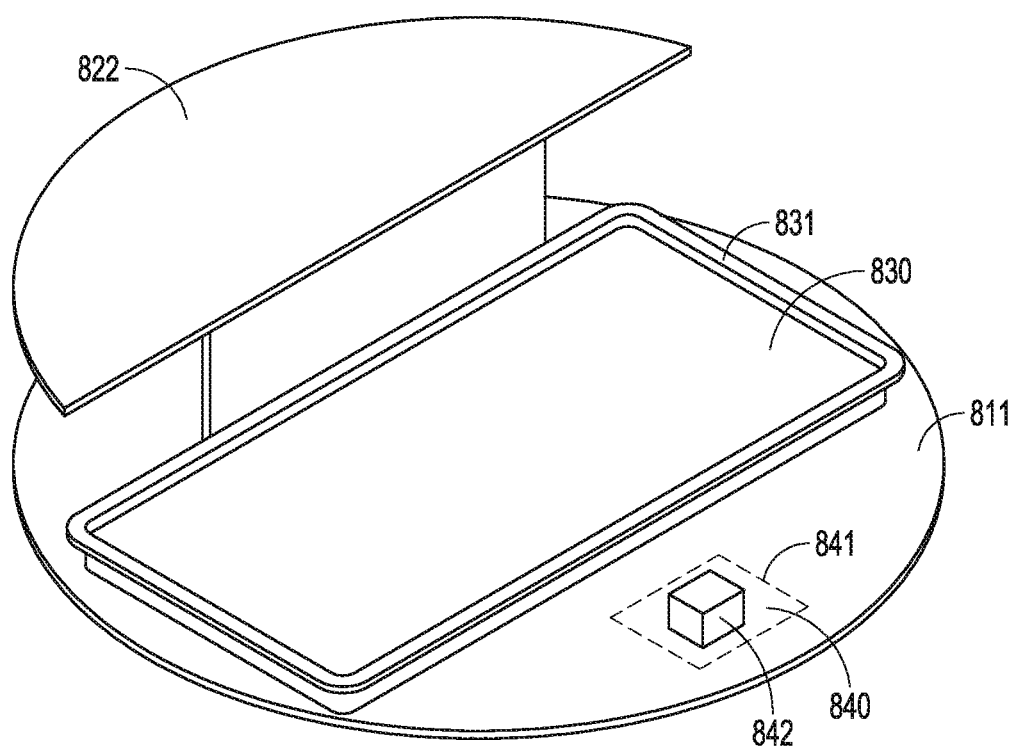
FIG. 8B is an illustration of an embodiment of a varmint control device.

FIG. 8A is an illustration of an embodiment of a varmint control device 800. The device 800 includes a housing 810. The housing 810 includes an opening 820, which permits a varmint to crawl through and enter into the housing. Small openings 825 permit the scent of bait that is placed within the housing to exude from the housing and attract a varmint. The housing 810 also includes transparent material 818 so that one can observe whether a varmint has been trapped within the device 800. Referring now to FIG. 8B, the housing 810 rests on a base 811. Attached to the base 811 is a platform 822. In another embodiment, the platform 822 is not present. When the housing 810 is placed onto the base 811, the opening 820 should be slightly above the platform 822. As with other embodiments, the base 811 further includes a tray 831 with an adhesive 830, and a demarcation 841 defining an area 840 for the placement of bait to attract a varmint. The area 840 can also include a container 842 or other device to hold the bait. As with other embodiments, a varmint will enter the device 800 onto the platform 822 via the opening 820. The varmint will sense the bate on the opposite side of the housing, and in the course of trying to access the bait, will forcibly contact the adhesive 830, and become trapped therein.

Figure 9:
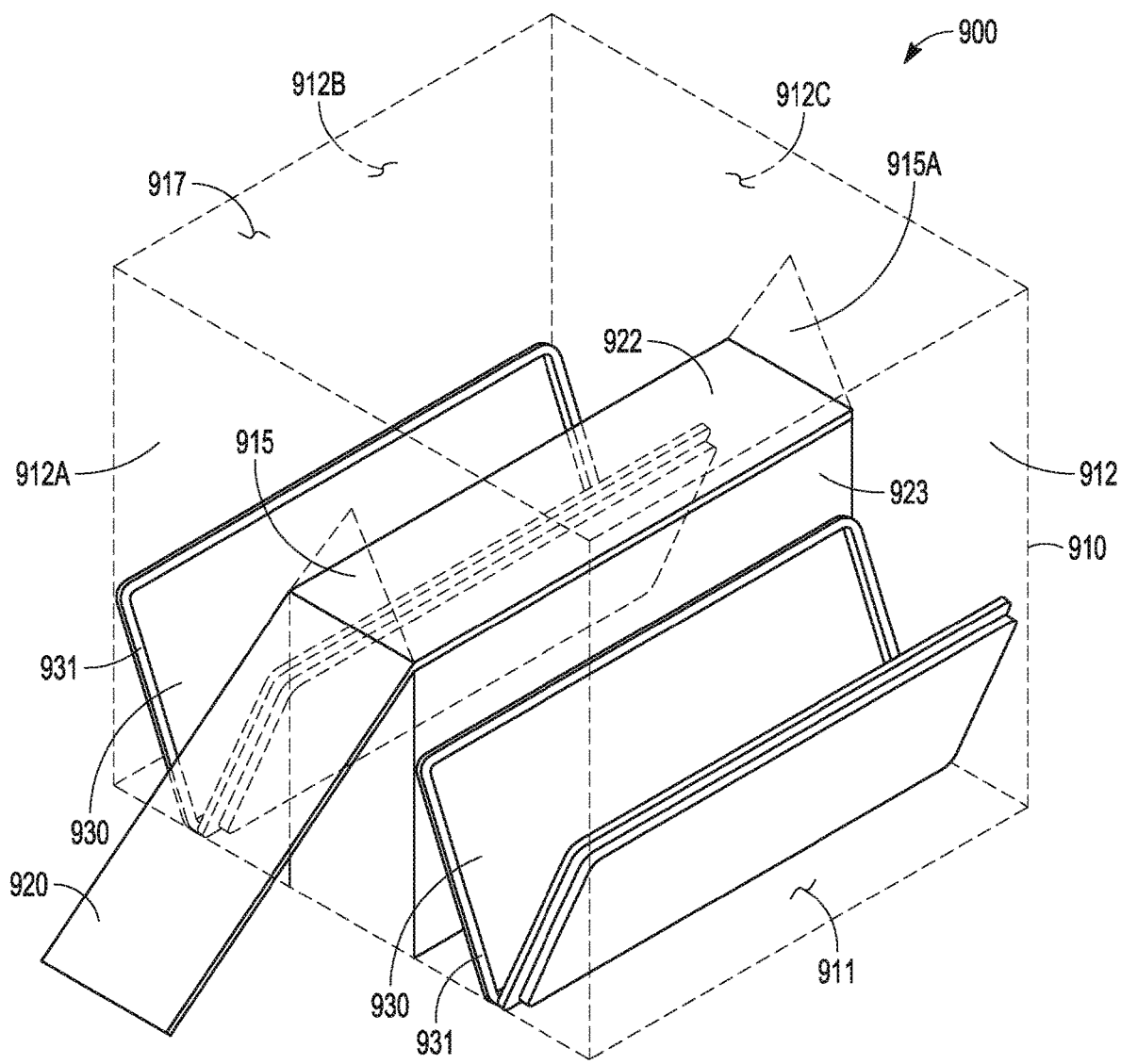
FIG. 9 is an illustration of an embodiment of a varmint control device.

FIG. 9 illustrates another embodiment of a device 900 to trap or capture a rodent or other varmint. The device 900 of FIG. 9 includes a housing 910. The housing 910 can be made of any suitable material including plastic (both clear and opaque), metal, aluminum, cardboard, etc. The housing 910 in FIG. 9 is drawn in a dotted line format to indicate that while the housing 910 can be opaque, it is illustrated in FIG. 9 in a transparent manner such that the contents of the housing 910 can be seen. The housing includes four walls 912, 912A, 912B, and 912C, which are attached to a base level 911. An embodiment includes a ceiling 917 that is attached to the walls 912, 912A, 912B, and 912C. Depending on the embodiment, the ceiling can be about twelve inches above the base level 911. The ceiling 917 can be a simple covering, similar to a top of an ordinary shoe box, that can be removed to permit the removal and/or replacement of the contents of the device. The ceiling 917 can also be attached to one of the walls 912, 912A, 912B, or 912C in a hinged manner to permit the raising of the ceiling 917 to expose the contents inside the device 900. In another embodiment, there is no ceiling and the top of the housing is simply open leaving the inside and contents of the device 900 accessible. In yet another embodiment, the ceiling 917 is made out of a transparent or clear material so that the contents of the device 900 can be viewed without having to remove the ceiling 917. Alternatively, one of the walls 912, 912A, 912B, or 912C can be removable, by hinges or other means, to permit access to the contents inside of the device 900.

The housing 910 includes an opening or aperture 915. In an embodiment, the housing 910 can include a second opening 915A. The openings 915, 915A are sized depending upon the type of varmint desired to be trapped. For example, the openings 915, 915A can be sized to permit a mouse to enter the housing 910, but would be sized larger if it was desired to trap rats instead of or in addition to mice. As illustrated in FIG. 9, the opening 915 is positioned at an approximate center of the wall 912A. As further can be seen in FIG. 9, the opening 915 is positioned distant from the wall 912C of the housing. Depending on the embodiment, the distance from the opening 915 to the wall 912C can be from six to twelve inches or more. A ramp 920 could be positioned adjacent to the opening 915 in the housing. The ramp 920 would extend from the base level 911 to the opening 915. A platform 922 extends from the opening 915 to the opening 915A. The platform 922 can be supported by one or more interior walls 923. In another embodiment, either the ramp 920 and/or the platform 922 are not present. One or more trays 931 are positioned in the device 900 at the base level 911 to form an angle as illustrated in FIG. 9. An adhesive 930 is contained within the one or more trays 931. The one or more trays 931 can be typical glue traps that are used to trap mice, rats, and other varmints, and which can be purchased at any hardware or home supply store. As illustrated in FIG. 9, the angle formed by the one or more trays forms a crevice. This crevice increases the surface area of the glue that will contact and trap a varmint. This is particularly helpful in the case of larger varmints such as rats. As with other embodiments, the elevation of the platform 922 over the one or more trays 931 will cause or force the varmint to fall onto, jump onto, or otherwise impact the adhesive 930 with some force. As with other embodiments, bait can be placed on the one or more trays 931 to attract the varmint.

Figure 10:
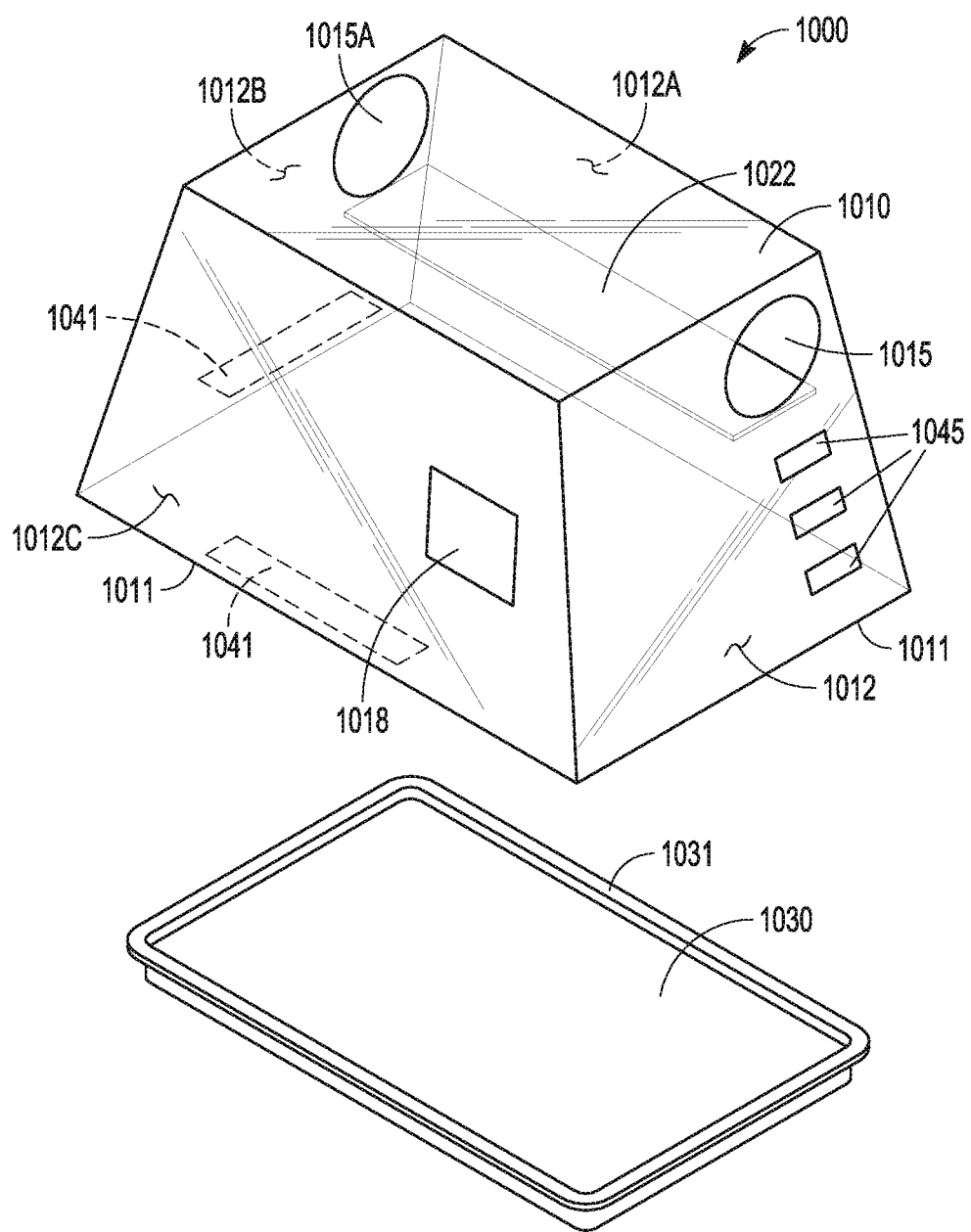
FIG. 10 is an illustration of an embodiment of a varmint control device.

FIG. 10 illustrates another embodiment of a device 1000 to trap or capture a rodent or other varmint. The device 1000 of FIG. 10 includes a housing 1010. The housing 1010 can be made of any suitable material including plastic (both clear and opaque), metal, aluminum, cardboard, etc. If opaque, the housing can include a window 1018 so that the contents of the device can be seen. The housing includes four walls 1012, 1012A, 1012B, and 1012C. In an embodiment, the wall 1012A can be made of a transparent material so that the contents of the housing 1010 can easily be seen. In another embodiment, the housing is a dome. As illustrated in FIG. 10, the housing 1010 is sized to fit over a glue tray 1031 or other container that has an adhesive 1030 deposited therein. The glue tray 1031 can be a typical glue trap that is used to trap mice, rats, and other varmints, and which can be purchased at any hardware or home supply store. In contrast to some other embodiments, the housing 1010 has no base.

The housing 1010 includes an opening or aperture 1015. In an embodiment, the housing 1010 can include a second opening 1015A. The openings 1015, 1015A are sized depending upon the type of varmint desired to be trapped. For example, the openings 1015, 1015A can be sized to permit a mouse to enter the housing 1010, but would be sized larger if it was desired to trap rats instead of or in addition to mice. As illustrated in FIG. 10, the opening 1015 is elevated from a lower portion 1011 of the walls 1012, 1012A, 1012B, and 1012C. Depending on the embodiment, the opening 1015 can be positioned from three to six or more inches above the lower portion 1011. Indentations or protrusions 1045 can be placed on the wall 1012 of the housing such that a varmint can more easily scale the wall 1012 to gain access to the opening 1015. As further can be seen in FIG. 10, the opening 1015 is positioned distant from the wall 1012B of the housing. Depending on the embodiment, the distance from the opening 1015 to the wall 1012B can be from three to six or more inches. A platform 1022 is positioned adjacent to the openings 1015, 1015A in the housing. In another embodiment, the platform 1022 is not present.

Prior to placing the device 1010 over a glue tray 1031, bait can be placed on the adhesive 1030 that is contained within the glue tray 1031. As with other embodiments, the purpose of the bait is to attract a varmint. A typical bait used to attract a varmint is peanut butter. The housing 1010 can further include a shelf 1041 on the interior of the wall 1012 B or the wall 1012C close to the lower portion 1011. The shelf 1041 is for receiving the bait (in lieu of placing the bait directly on the adhesive). As illustrated in FIG. 10, the shelf 1041 can be located beneath the platform 1022 on wall 1012B such that the varmint has to let itself down with force onto the adhesive 1030, or it can be located distant from the platform 1022 on wall 1012C so that the varmint has to leap towards the bait on the shelf 1041 or the bait on the adhesive, such that the varmint impacts the adhesive 1030 with even more force.

EXAMPLE EMBODIMENTS

1. Example No. 1 includes an apparatus for trapping a varmint comprising a housing; a first opening in a first wall of the housing, the first opening elevated from a base level of the housing and positioned distant from a second wall of the housing; a ramp positioned adjacent to the first opening in the housing, the ramp extending from the base level of the housing to the first opening in the first wall of the housing; and an adhesive positioned on the base level of the housing.

2. Example No. 2 includes all the features of Example No. 1, and optionally includes an apparatus wherein the ramp extends into the housing.

3. Example No. 3 includes all the features of Example Nos. 1-2, and optionally includes an area proximate the second wall of the housing and proximate the base level of the housing for receiving a substance to attract the varmint; and one or more apertures in the second wall of the housing proximate the substance such that an aroma from the substance can emanate from the housing.

4. Example No. 4 includes all the features of Example Nos. 1-3, and optionally includes an apparatus wherein the housing comprises a third wall and a fourth wall, wherein the first wall, the second wall, the third wall, and the fourth wall are attached to the base level of the housing.

5. Example No. 5 includes all the features of Example Nos. 1-4, and optionally includes a ceiling coupled to the first wall, the second wall, the third wall, and the fourth wall, the ceiling positioned over and distant from the base level of the housing.

6. Example No. 6 includes all the features of Example Nos. 1-5, and optionally includes an apparatus wherein the ceiling is removable from the housing.

7. Example No. 7 includes all the features of Example Nos. 1-6, and optionally includes an apparatus wherein one of the first wall, the second wall, the third wall, or the fourth wall is removably attached to the base level of the housing.

8. Example No. 8 includes all the features of Example Nos. 1-7, and optionally includes an apparatus wherein the removably attached first wall, second wall, third wall, or fourth wall comprises a hinge.

9. Example No. 9 includes all the features of Example Nos. 1-8, and optionally includes a second opening in the housing, the second opening in the housing positioned in a third wall of the housing, the third wall of the housing opposite the first wall of the housing, wherein the ramp extends from the first opening in the housing through the housing to the second opening in the housing, and through the second opening in the housing to the base level of the housing.

10. Example No. 10 includes all the features of Example Nos. 1-9, and optionally includes an apparatus wherein the first opening is sized such that the varmint not larger than a rodent can enter into the housing.

11. Example No. 11 includes an apparatus for trapping a varmint comprising a housing; a first opening in a first wall of the housing, the first opening positioned at a base level of the housing and positioned distant from a second wall of the housing; a ramp positioned adjacent to the first opening in the first wall of the housing and positioned within the housing, the ramp rising to a platform within the housing, the platform elevated from the base level of the housing; and an adhesive positioned on the base level of the housing.

12. Example No. 12 includes all the features of Example No. 11, and optionally includes a first vertical wall within the housing and a second vertical wall within the housing, the first vertical wall and the second vertical wall positioned adjacent to the ramp, the first vertical wall and the second vertical wall separated from each other by the platform.

13. Example No. 13 includes all the features of Example Nos. 11-12, and optionally includes an area proximate the second wall of the housing and proximate the base level of the housing for receiving a substance to attract the varmint.

14. Example No. 14 includes an apparatus for trapping a varmint comprising a housing; a first opening in a first wall of the housing, the first opening positioned at a base level of the housing and positioned distant from a second wall of the housing; a ramp positioned adjacent the first opening in the housing, the ramp rising up from the base level of the housing such that an end of the ramp opposite the opening is elevated from the base level of the housing; and an adhesive positioned on the base level of the housing.

15. Example No. 15 includes all the features of Example No. 14, and optionally includes an an area proximate the second wall of the housing and proximate the base level of the housing for receiving a substance to attract the varmint.

16. Example No. 16 includes an apparatus for trapping a varmint comprising a housing; an opening in a first wall of the housing, the opening elevated from a base level of the housing and positioned distant from a second wall of the housing; a platform positioned inside of the housing and adjacent to a bottom portion of the opening in the first wall of the housing, the platform elevated from the base level of the housing; and an adhesive positioned on the base level of the housing.

17. Example No. 17 includes all the features of Example No. 16, and optionally includes an area proximate the second wall of the housing and proximate the base level of the housing for receiving a substance to attract the varmint.

18. Example No. 18 includes an apparatus for trapping a varmint comprising a housing, the housing comprising a base, a first vertical wall coupled to the base, a second vertical wall coupled to the base, a third vertical wall coupled to the base, and an angled wall coupled to the base, the first vertical wall, the second vertical wall, and the third vertical wall; an opening positioned in the angled wall such that the opening is elevated above the base; and an adhesive positioned on the base of the housing.

19. Example No. 19 includes all the features of Example No. 18, and optionally includes an area of the base for receiving a substance to attract the varmint, wherein the opening in the angled wall is elevated above the area of the base for receiving the substance to attract the varmint.

20. Example No. 20 includes an apparatus for trapping a varmint comprising a housing, the housing comprising a base, a first wall coupled to the base, a second wall coupled to the base, a third wall coupled to the base, and a fourth wall coupled to the base; a ceiling coupled to the first wall, the second wall, the third wall, and the fourth wall, the ceiling elevated above the base; an opening in the ceiling, the opening elevated above the base of the housing; and an adhesive positioned on the base of the housing.

21. Example No. 21 includes all the features of Example No. 20, and optionally includes a plurality of indentations or protrusions in the first wall, the second wall, the third wall, or the fourth wall for enabling the varmint to scale the first wall, the second wall, the third wall, or the fourth wall.

22. Example No. 22 includes all the features of Example Nos. 20-21, and optionally includes an area of the base for receiving a substance to attract the varmint, wherein the opening in the top ceiling is elevated above the area of the base for receiving the substance to attract the varmint.

23. Example No. 23 includes an apparatus for trapping a varmint comprising a housing, the housing comprising a base; an opening in the housing, the opening elevated above the base; and an adhesive positioned on the base of the housing.

24. Example No. 24 includes all the features of Example No. 23, and optionally includes an area of the base for receiving a substance to attract the varmint, wherein the opening is elevated above the area of the base for receiving the substance to attract the varmint.

25. Example No. 25 includes all the features of Example Nos. 23-24, and optionally includes a first wall coupled to the base, a second wall coupled to the base, a third wall coupled to the base, and a fourth wall coupled to the base; and a ledge coupled to one or more of a top portion of the first wall, a top portion of the second wall, a top portion of the third wall, or a top portion of the fourth wall, wherein the ledge is substantially horizontal to the base.

26. Example No. 26 includes all the features of Example Nos. 23-25, and optionally includes a covering, the covering positioned above the base and the adhesive, the covering coupled to one or more of the first wall, the second wall, the third wall, and the fourth wall, the covering positioned to maintain at least a portion of the opening in the housing.

27. Example No. 27 includes all the features of Example Nos. 23-26, and optionally includes an apparatus wherein one or more of the first wall, the second wall, the third wall, and the fourth wall lean towards an interior of the apparatus; and comprising a covering, the covering comprising a first panel, a second narrow panel substantially perpendicular to the first panel, and one or more narrow panels that are non-perpendicular to the first panel; wherein a first edge of the first panel is coupled to the ledge coupled to the top portion of the first wall, wherein a second edge of the second panel is coupled to the ledge coupled to the top portion of the second wall such that the first panel is not parallel to the base, thereby providing a space between one or more of the third wall and the fourth wall and the one or more panels that are non-perpendicular to the first panel.

28. Example No. 28 includes a container for trapping a rodent comprising a floor; a plurality of walls connected to the floor; an aperture in at least one of the plurality of walls; a platform positioned within the container, the platform positioned adjacent to the aperture and elevated above the floor; and an adhesive positioned on the floor; wherein the aperture is sized to permit the rodent to gain access to the platform.

29. Example No. 29 includes all the features of Example No. 28, and optionally includes means exterior to the container for permitting the rodent to gain access to the aperture and the platform.

30. Example No. 30 includes all the features of Example Nos. 28-29, and optionally includes an apparatus wherein the elevation of the platform above the floor is such that the rodent can forcefully become entrapped in the adhesive by descending, falling, or jumping onto the adhesive.

31. Example No. 31 includes all the features of Example Nos. 28-30, and optionally includes an apparatus wherein the adhesive comprises a glue board or a glue trap.

32. Example No. 32 includes all the features of Example Nos. 28-31, and optionally includes a top connected to the plurality of walls, and wherein the plurality of walls or the top comprises a transparent portion to allow for visual inspection of an interior of the container.

33. Example No. 33 includes all the features of Example No. 12, and optionally includes an apparatus wherein the housing, the first vertical wall within the housing, the second vertical wall within the housing, the ramp, and the platform form a compartment in the housing, and comprising an opening in the housing permitting access to the compartment by the varmint.

34. Example No. 34 includes all the features of Example Nos. 12 and 33, and optionally includes a tray or other device within the compartment for receiving a rodenticide or other poison.

35. Example No. 35 includes an apparatus for trapping a varmint comprising a housing; an opening in a first portion of the housing, the opening elevated from a base level of the housing and positioned distant from a second portion of the housing; a platform positioned inside of the housing and adjacent to a bottom portion of the opening in the first portion of the housing, the platform elevated from the base level of the housing; and an adhesive positioned on the base level of the housing.

36. Example No. 36 includes all the features of Example No. 35, and optionally includes an area proximate the second portion of the housing and proximate the base level of the housing for receiving a substance to attract the varmint.

37. Example No. 37 includes all the features of Example No. 16, and optionally includes an apparatus wherein the adhesive is contained within a tray, the tray positioned below and adjacent to the elevated platform, the tray comprising a first section and a second section, the first section and the second section forming an obtuse angle, and a vertex of the obtuse angle positioned proximate to the base level of the housing.

38. Example No. 38 includes all the features of Example Nos. 16 and 37, and optionally includes an apparatus wherein the obtuse angle comprises an acute angle.

39. Example No. 39 includes an apparatus for trapping a varmint comprising a housing; an opening in a first wall of the housing, the opening elevated from a base level of the housing; an elevated platform in positioned inside of the housing and adjacent to a bottom portion of the opening in the first wall of the housing, the elevated platform elevated from the base level of the housing; and a tray positioned below and adjacent to the elevated platform, the tray comprising a first section and a second section, the first section and the second section forming an obtuse angle, a vertex of the obtuse angle positioned proximate to the base level of the housing, and the tray containing an adhesive disposed in the tray.

40. Example No. 40 includes all the features of Example No. 39, and optionally includes an apparatus wherein the obtuse angle comprises an acute angle.

41. Example No. 41 includes all the features of Example Nos. 39-40, and optionally includes an apparatus wherein the first section comprises a first separate tray and the second section comprises a second separate tray.

42. Example No. 42 includes all the features of Example Nos. 39-41, and optionally includes a second opening in a second wall of the housing, the second wall of the housing opposite the first wall of the housing, and wherein the elevated platform extends from the first opening to the second opening.

43. Example No. 43 includes all the features of Example Nos. 39-42, and optionally includes an apparatus wherein the first opening is positioned in an approximate center of the first wall and the second opening is positioned in an approximate center of the second wall.

44. Example No. 44 includes all the features of Example Nos. 39-43, and optionally includes a first interior wall and a second interior wall, the first interior wall and the second interior wall extending from the platform to the base, and the first interior wall and the second interior wall supporting the platform.

45. Example No. 45 includes all the features of Example Nos. 39-44, and optionally includes an apparatus wherein the first section of the tray is in contact with and supported by the first interior wall and the second section of the tray is in contact with and supported by a third wall.

46. Example No. 46 includes all the features of Example Nos. 39-45, and optionally includes an apparatus wherein the first section of the tray and the second section of the tray are in contact with and supported by the first wall and the second wall.

47. Example No. 47 includes all the features of Example Nos. 39-46, and optionally includes an apparatus wherein the vertex is in contact with the base level of the housing.

48. Example No. 48 includes all the features of Example Nos. 39-47, and optionally includes a ceiling coupled to the first wall of the housing.

49. Example No. 49 includes all the features of Example Nos. 39-48, and optionally includes an apparatus wherein the ceiling comprises a clear material.

50. Example No. 50 includes an apparatus for trapping a varmint comprising a housing an opening in the housing, the opening providing access to an interior of the housing; and an elevated platform positioned in the interior of the housing, wherein the opening provides access to the elevated platform; and wherein the housing is operable to be placed over an adhesive.

51. Example No. 51 includes all the features of Example No. 50, and optionally includes an apparatus wherein the adhesive comprises a glue tray.

52. Example No. 52 includes all the features of Example Nos. 50-51, and optionally includes the glue tray.

53. Example No. 53 includes all the features of Example Nos. 50-52, and optionally includes the adhesive.

54. Example No. 54 includes all the features of Example Nos. 50-53, and optionally includes an apparatus wherein the opening is positioned adjacent to the elevated platform.

55. Example No. 55 includes all the features of Example Nos. 50-54, and optionally includes an apparatus wherein the opening is positioned at a lower portion of the housing, and comprising a ramp coupling the opening to the elevated platform.

56. Example No. 56 includes all the features of Example Nos. 50-55, and optionally includes an apparatus wherein the housing comprises a first wall, a second wall, a third wall, a fourth wall, and a ceiling, and wherein the housing does not comprise a floor or a base level.

57. Example No. 57 includes all the features of Example Nos. 50-56, and optionally includes an apparatus wherein the housing comprises a dome, and wherein the housing does not comprise a floor or a base level.

58. Example No. 58 includes all the features of Example Nos. 50-57, and optionally includes a shelf coupled to an interior of the housing, the shelf operable for receiving bait to attract the varmint.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that foils a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

The invention claimed is:

1. An apparatus for trapping a rodent comprising:
a housing, the housing comprising a base;
an opening in the housing, the opening elevated above the base; and
an adhesive positioned on the base of the housing.

2. The apparatus for trapping a rodent according to claim 1, comprising an area of the base for receiving a substance to attract the rodent, wherein the opening is elevated above the area of the base for receiving the substance to attract the rodent.

3. The apparatus for trapping a rodent according to claim 1, comprising a first wall coupled to the base, a second wall coupled to the base, a third wall coupled to the base, and a fourth wall coupled to the base; and a ledge coupled to one or more of a top portion of the first wall, a top portion of the second wall, a top portion of the third wall, or a top portion of the fourth wall, wherein the ledge is substantially horizontal to the base.

4. The apparatus for trapping a rodent according to claim 3, comprising a covering, the covering positioned above the base and the adhesive, the covering coupled to one or more of the first wall, the second wall, the third wall, and the fourth wall, the covering positioned to maintain at least a portion of the opening in the housing.

5. The apparatus for trapping a rodent according to claim 3, wherein one or more of the first wall, the second wall, the third wall, and the fourth wall lean towards an interior of the apparatus; and
comprising a covering, the covering comprising a first panel, a second narrow panel substantially perpendicular to the first panel, and one or more narrow panels that are non-perpendicular to the first panel;
wherein a first edge of the first panel is coupled to the ledge coupled to the top portion of the first wall, wherein a second edge of the second panel is coupled to the ledge coupled to the top portion of the second wall such that the first panel is not parallel to the base, thereby providing a space between one or more of the third wall and the fourth wall and the one or more panels that are non-perpendicular to the first panel.

* * * * *